United States Patent [19]

Hibst

[11] 4,425,250

[45] Jan. 10, 1984

[54] PREPARATION OF FINELY DIVIDED FERRITE POWDERS

[75] Inventor: Hartmut Hibst, Ludwigshafen, Fed. Rep. of Germany

[73] Assignee: BASF Aktiengesellschaft, Fed. Rep. of Germany

[21] Appl. No.: 408,598

[22] Filed: Aug. 16, 1982

[30] Foreign Application Priority Data

Aug. 19, 1981 [DE] Fed. Rep. of Germany ....... 3131681
Aug. 19, 1981 [DE] Fed. Rep. of Germany ....... 3132678
Aug. 19, 1981 [DE] Fed. Rep. of Germany ....... 3132683

[51] Int. Cl.³ ............................................. C04B 35/26
[52] U.S. Cl. ................................. 252/62.59; 423/594;
423/632; 252/62.56; 252/62.6; 252/62.61;
252/62.62; 252/62.63; 252/62.64
[58] Field of Search .......................... 423/632, 594;
252/62.56, 62.6, 62.59, 62.61, 62.62, 62.63,
62.64

[56] References Cited

U.S. PATENT DOCUMENTS

| | | | |
|---|---|---|---|
| 3,102,099 | 8/1963 | Stuijts | 252/62.63 X |
| 3,150,925 | 9/1964 | Gambino | 423/594 X |
| 3,509,057 | 4/1970 | Greger | 423/594 X |
| 3,582,266 | 6/1971 | Sopp et al. | 423/632 |
| 3,634,254 | 1/1972 | Micheli | 252/62.63 |
| 3,793,443 | 2/1974 | Arendt | 423/594 |
| 3,810,973 | 5/1974 | Arendt et al. | 423/594 |
| 4,120,807 | 10/1978 | Watanabe et al. | 252/62.62 |

FOREIGN PATENT DOCUMENTS

| | | |
|---|---|---|
| 1254390 | 6/1970 | United Kingdom . |
| 1317088 | 5/1973 | United Kingdom . |
| 1318889 | 5/1973 | United Kingdom ............. 252/62.63 |

OTHER PUBLICATIONS

K. Haneda, "Journal of the American Ceramic Society", vol. 57, No. 8, (1974), pp. 354–357.
A. Tauber et al., J. Appl. Phys., Suppl. 33 (1962), p. 1381 S.
A. Tauber et al., J. Appl. Phys. 35 (part 2) (1964), p. 1008.

Primary Examiner—Jack Cooper
Attorney, Agent, or Firm—Keil & Witherspoon

[57] ABSTRACT

A process for the preparation of finely divided ferrites of the general formula $$MeFe_2O_4 \qquad (I)$$

where $Me = aMn + bNi + cZn + dCo + eFe(II)$, and the atomic weight ratios a, b, c, d and e are each from 0 to 1 and their sum is 1, or $$M^1_2Me^1_2Fe_{12}O_{22} \qquad (II)$$

where $M^1$ is barium, strontium, calcium and/or lead, and $Me^1$ is divalent manganese, copper, iron, cobalt, nickel, zinc, magnesium and/or equimolar amounts of lithium and trivalent iron, or $$M^2(Me^2Ti)_xFe_{12-2x}O_{19} \qquad (III)$$

where $M^2$ is barium or strontium, $Me^2$ is zinc, nickel and/or cobalt and x is from 0 to 2.0, wherein the salts required for the particular composition are mixed with sodium carbonate and/or potassium carbonate, the mixture obtained is heated at 700° to 1200° C., and the resulting ferrite is then isolated by leaching with water.

4 Claims, No Drawings

PREPARATION OF FINELY DIVIDED FERRITE POWDERS

The present invention relates to a process for the preparation of finely divided ferrites of the general formula $$MeFe_2O_4 \quad (I)$$

where $Me = aMn + bNi + cZn + dCo + eFe(II)$, and the atomic weight ratios a, b, c, d and e are each from 0 to 1 and their sum is 1, or $$M_2^1Me_2^1Fe_{12}O_{22} \quad (II)$$

where $M^1$ is barium, strontium, calcium and/or lead, and $Me^1$ is divalent manganese, copper, iron, cobalt, nickel, zinc, magnesium and/or equimolar amounts of lithium and trivalent iron, or $$M^2(Me^2Ti)_xFe_{12-2x}O_{19} \quad (III)$$

where $M^2$ is barium or strontium, $Me^2$ is zinc, nickel and/or cobalt and x is from 0 to 2.0.

Magnetically soft manganese zinc ferrite and nickel zinc ferrite powders of the type shown in formula (I) which are used for producing magnetic head ceramics, and shielding materials, are conventionally prepared by a ceramic process. For this purpose, manganese oxide or nickel oxide is mixed with zinc oxide and iron (III) oxide in the ratio which corresponds to the chemical formula of the ferrite to be produced, and the mixture is heated at from 1100° to 1200° C., the magnetically soft spinel ferrite being formed. The sintered crystallite conglomerates formed are then milled, generally in the presence of water, to give a powder of particle size about 1 μm. The milling creates crystal defects in the particles, resulting in poorer magnetic properties. Furthermore, the milled ferrite powders exhibit a broad particle size spectrum. Accordingly, the magnetically soft ferrite ceramic produced by processing these powders further also exhibits, inter alia, a broad particle size spectrum.

In addition to a ceramic process, co-precipitation processes have also been employed for preparing MnZn ferrites and NiZn ferrites. These processes have the disadvantage that the co-precipitate produced in a liquid phase is too finely divided, and accordingly very difficult to separate from the liquid phase. Since, furthermore, finely divided precipitated products may run through the filter, it is difficult to obtain these with a composition corresponding to the specified molar ratio of the particular components. A further disadvantage is that the ferrites obtained are difficult to disperse, because they have sintered during heating, and must be milled before being used further.

Furthermore, it has been disclosed that ferrites of the spinel type having the composition $MeFe_2O_4$ may be prepared from aqueous solution by oxidizing Me-Fe(II) hydroxide co-precipitates. However, the ferrites prepared in this manner are very finely divided, and, when they are compressed, the resulting moldings have comparatively low, inadequate densities.

For the production of magnetic ceramics and magnetically soft plastoferrites, it is desirable to have isotropic ferrite powders of the spinel type which possess a narrow particle size distribution, high compressability, and good dispersibility for incorporation into organic binders.

The hexagonal $Me_2Y$ ferrite phase of the composition $M_2^1Me_2^1Fe_{12}O_{22}$ (formula II), where $M^1$ is Ba, Sr, Ca, and/or Pb and $Me^1$ is Mn(II), Cu(II), Fe(II), Co(II), Ni(II), Zn, Mg and/or (Li+Fe(III))/2, which is used for producing magnetic ceramics for high frequency technology is also conventionally prepared by a ceramic process. For this purpose, $M^1CO_3$, $Mc^1CO_3$ or $Me^1O$ and iron oxide are mixed in the ratio which corresponds to the chemical formula of the ferrite to be produced, and the mixture is heated, ie. pre-sintered, at from 1100° to 1300° C. The resulting highly sintered conglomerates of flaky crystallites are then milled, generally in the presence of water, to give a powder of particle size about 1 μm. However, the milling destroys the greater part of the flakes formed, and only a powder having a broad particle size distribution is obtained.

In addition, co-precipitation processes have also been employed for preparing the $Me_2^1Y$ ferrite. Thus, Japanese Preliminary Published Application Nos. 50 106899 and 50 039700 describe processes in which the dissolved metal cations are precipitated as sparingly soluble organometallic compounds by means of organic complex formers in ammoniacal solution, and these compounds are filtered off and washed. The dry precipitate is then heated at from 1100° to 1300° C. In J. Korean. Ceram. Soc. 16 (2) (1979), 89–98, T.-O. Kim et al. describe a process in which an aqueous solution containing $BaCl_2$, $Zn(NO_3)_2$ and $FeCl_3$ is treated with an $NaOH/Na_2CO_3$ solution, and the precipitate obtained is washed, freeze-dried andd then heated. Although the resulting powders contain the desired $Zn_2Y$ ferrite as the main component, they comprise more than one phase. Moreover, the freeze-drying process is very expensive and uneconomical. The above co-precipitation processes have the further disadvantage that the co-precipitate produced in a liquid phase is finely divided and accordingly difficult to separate from the liquid phase. Since, on filtering and subsequent washing, finely divided precipitated products may run through the filter, it is difficult to obtain these with a composition corresponding to the specified molar ratios of the particular components. Because of these shortcomings, these processes have hitherto not been operated industrially. They have the further disadvantage that the resulting ferrites, because they have sintered during heating, must be milled before being used further.

Co-precipitations in general bring about intimate contact between the reactants and thus accelerate the reaction. However, flux processes are also known, in which fluxes are employed to promote th reaction between the individual metal oxides. Thus, $Me_2^1Y$ ferrites may be crystallized out from sodium ferrite melts [A. Tauber et al., J. Appl. Phys., Suppl. 33 (1962), 1381 S] or barium borate melts [A. Tauber, et al., J. Appl. Phys. 35 Part 2 (1964), 1008]. However, the processes have to be carried out at 1200° C. or above.

For various applications in high frequency technology, it is desirable to have an $Me_2^1Y$ powder which may be sintered to give a very dense, magnetically soft ceramic, and has flaky particles which can be readily oriented in a magnetic field. It is also desirable to have a powder which may be readily incorporated into plastic or rubber. Magnetically soft plastoferrites produced in this manner can absorb, for example, radio waves, and are useful as shielding materials. A further useful $Me_2^1Y$ powder is one which may be readily dispersed in a finish to give a magnetically soft paint for shielding purposes.

It was therefore desirable to provide a simple and cheap process for the preparation of a hexagonal $Me_2^1Y$ ferrite powder, in which the product obtained fulfils the above requirements. A magnetically soft hexagonal ferrite powder of this type must possess a single phase, a narrow particle size distribution, and good dispersibility, for incorporation into organic binders, and must be readily oriented in a magnetic field.

The ferrite powders of the formula (III) which are employed for the production of ferrite permanent magnets and of substantially counterfeit-proof magnetic recordings are also usually prepared by a ceramic process. For this purpose, barium carbonate or strontium carbonate and iron oxide are mixed in the ratio which corresponds to the chemical formula of the ferrite to be produced, and the mixture is heated, ie. pre-sintered, at from 1100° C. to 1300° C. On pre-sintering, the magnetic hexaferrite is formed. The sintered crystallite conglomerates formed are then milled, generally in the presence of water, to give a powder of particle size about 1 $\mu$m. The milling creates crystal defects in the particles, which reduce the coercivity. Ferrite powders produced in this manner generally have very good specific remanence, but the magnetization coercive force $_jH_c$ is very low, being about 200 kA/m before milling and 150 kA/m after milling. These crystal defects caused by milling can be only partially eliminated by heating after milling, or by a sintering process. Consequently, the magnets which are produced from milled magnetically hard barium ferrite powder and which are used in industry at the present time have $_jH_c$ values of only from 280 to 320 kA/m. Furthermore, the milled ferrite powders exhibit a broad particle size spectrum.

An alternative process is described in, for example, German Laid-Open Application DOS No. 2,832,892. In this, a Be-Fe(III) nitrate solution is sprayed, in a tower, in counter-current to a heating gas at 1200° C. The process has the disadvantage that the Ba ferrite powder obtained is contaminated with $\alpha$-$Fe_2O_3$, thereby reducing the saturation magnetization and residual magnetization compared to one-phase ferrite. Furthermore, the crystallites obtained are partially sintered together, so that before further use the powder must be milled.

In addition to the above processes, co-precipitation processes have also been employed for preparing barium ferrites and strontium ferrites. Thus, K. Haneda et al., J. Amer. Ceram. Soc. 57 (8) (1974), 354–7, describe the preparation of highly coercive barium ferrite by heating a filtered-off, washed and dried $BaCO_3$/Fe(OH)$_3$ co-precipitate at 925° C. The co-precipitate is prepared by mixing a Ba-Fe(III) chloride solution and an NaOH/$Na_2CO_3$ solution, using an almost 4-fold excess of alkali. Another co-precipitation process from Ba-Fe(III) chloride solution and excess $Na_2CO_3$ solution is disclosed in German Laid-Open Application DOS No. 1,948,914 (U.S. Pat. No. 3,582,266). The co-precipitate of Ba carbonate and Fe(III) carbonate is filtered off, washed, spray-dried, and heated at 1100° C. The excess $Na_2CO_3$ serves to permit effective removal of salt constituents after filtration. However, the high temperature required for the heat treatment results in coarse ferrite powders having particle sizes of 0.5–1.0 $\mu$m, and $H_c$ values which are also obtainable by the ceramic process. A further co-precipitation process is disclosed in British Pat. No. 1,254,390 (U.S. Pat. No. 3,634,254). This employs an ammoniacal Ba-Fe(III) nitrate solution, the cations being precipitated with an ammonium salt of a fatty acid. Here again, a heat treatment is required, with its consequent adverse effects on the particle size spectrum.

The above processes have the disadvantage that the co-precipitate produced in a liquid phase is too finely divided and accordingly very difficult to separate from the liquid phase. Since, furthermore, the precipitated finely divided Ba salt in part runs through the filter, it is difficult to obtain precipitated products of a composition corresponding to the specified molar ratio of the particular components. Because of these shortcomings, these processes have hitherto not been operated industrially. They have the further disadvantage that the ferrites obtained are difficult to disperse, because they have sintered during heating, and must be milled before being used further.

In order to overcome the disadvantage of poor filterability, German Published Application DAS No. 2,738,830 (U.S. Pat. No. 4,120,807) proposes producing a coarse $Fe_3O_4$ and $BaCO_3$, of particle size 0.5–0.7 $\mu$m, by co-precipitation. The Ba ferrite obtained after heating at from 400° to 900° C. has a crystallite diameter of 0.5–0.9 $\mu$m and is thus relatively coarse and, in part, is obtained in a sintered form.

Co-precipitations in general bring about intimate contact between the reactants and thus accelerate the reaction. However, flux processes are also known, in which fluxes, for example $B_2O_3$, alkali metal borates, PbO, alkali metal ferrites, $Bi_2O_3$, molybdates, alkali metal halides and alkali metal sulfates, are employed to promote the reaction between the individual metal oxides.

Thus, according to U.S. Pat. No. 3,793,443, barium ferrite is prepared by heating a $BaCO_3$/FeOOH/NaCl/KCl mixture. This publication considers that it is important to start from FeOOH as the iron component, in order to effect the ferrite formation in the presence of $H_2O$ produced in situ. Furthermore, complete ferrite formation is observed only at high temperatures, well above the melting point of the added alkali metal chlorides (ie. at about 1000° C.); lower temperatures give low yields of Ba ferrite. The process offers no improvement over the ceramic method in respect of coercive force achieved. Furthermore, the particles have a crystallite diameter of about 1–1.5 $\mu$m, ie. they are relatively coarse. According to German Laid-Open Application DOS No. 2,401,029 (U.S. Pat. No. 3,810,973), a suspension of iron(III) oxide hydrate in an alkali metal chloride solution is mixed with $BaCO_3$ powder, and the mixture is then spraydried, and heated at 1000°–1050° C. The process gives a relatively coarse hexagonal ferrite having crystallite diameters of about 1–1.5 $\mu$m. German Laid-Open Application DOS No. 2,143,793 describes a process for the preparation of barium ferrite, in which a $BaCO_3$/$Fe_2O_3$/$Na_2SO_4$/$K_2SO_4$ mixture is heated at 950° C. This process, also, gives a coarse ferrite.

For a number of uses in the field of counterfeit-proof coding, for example for identity cards and credit cards, and the magnetic storage of other identifying information, it is desirable to have magnetic recording media which possess higher coercive fields than the standard storage media used at the present time. Appropriate materials would be less sensitive to stray magnetic fields, and hence difficult to counterfeit.

It is an object of the present invention to provide a simple and economical process for the preparation of the said ferrites, in which the products obtained fulfil the requirements made. The ferrites obtainable by this process must possess, in particular, fine particles coupled with a narrow particle size distribution, and good dispersibility, for incorporation into organic binders. Moreover, the magnetically hard ferrites must have a high coercive force which is simple to set at a defined value.

We have found that this object is achieved and that, surprisingly, the finely divided ferrites of the general formula $$MeFe_2O_4 \qquad (I)$$

where $Me = aMn + bNi + cZn + dCo + eFe(II)$, and the atomic weight ratios a, b, c, d and e are each from 0 to 1 and their sum is 1, or $$M_2^1Me_2^1Fe_{12}O_{22} \qquad (II)$$

where $M^1$ is barium, strontium, calcium and/or lead, and $Me^1$ is divalent manganese, copper, iron, cobalt, nickel, zinc, magnesium and/or equimolar amounts of lithium and trivalent iron, or $$M^2(Me^2Ti)_xFe_{12-2x}O_{19} \qquad (III)$$

where $M^2$ is barium or strontium, $Me^2$ is zinc, nickel and/or cobalt and x is from 0 to 2.0, may be prepared, the products conforming to the requirements made, if the Me,$Me^1$, $Me^2$, $M^1$ and/or $M^2$ salts required for the particular composition corresponding to the formula (I), (II) or (III), iron (III) chloride and sodium carbonate and/or potassium carbonate are mixed, with or without a titanium compound, the mixture obtained is heated at from 700° to 1200° C. and the resulting finely divided ferrite of the predetermined composition is isolated by leaching with water.

The novel process may be used to prepare, in particular, isotropic ferrite powders having a spinel structure, of the general formula (I) $MeFe_2O_4$, where $Me = a$ Mn $+ b$ Ni $+ c$ Zn $+ d$ Co $+ e$ Fe(II) and the atomic weight ratios a, b, c, d and e are each from 0 to 1 and their sum is 1, and possessing the required properties, if one or more Me salts, iron(III) chloride and an alkali metal carbonate are mixed, the mixture obtained is heated at from 800° to 1200° C. and the resulting isotropic ferrite is isolated by leaching with water.

When working out the novel process, it was found to be advantageous to employ the particular Me salt or salts in the form of the chlorides or carbonates, the atomic weight ratio of iron(III) to the Me cations in the salts employed corresponding to the predetermined formula. Furthermore, it is advantageous if the alkali metal carbonate used is sodium carbonate or potassium carbonate, or a mixture of these, and in addition the atomic weight ratio of (Na+K) to Cl in the mixture used for the reaction is from 0.9 to 1.4. After the individual reactants have been brought together, they are mixed in a conventional manner, advantageously by being milled in a ball mill, to obtain a homogeneous distribution. The thoroughly mixed and milled mixture is then heated at from 800° to not more than 1200° C. for from 0.5 to 3 hours. After the melt has been cooled, the melt cake is treated with water, the alkali metal chloride being dissolved out and the ferrite powder remaining.

The novel process gives a finely divided, non-sintered ferrite powder of the spinel type. The product consists of isotropic octahedral crystallites having a good, regular crystal habit and a narrow particle size distribution. The diameter of the octahedral powder particles may be varied from 0.5 to 2.0 μm, depending on the reaction temperature used, and the specific surface area (BET) accordingly varies from 5 to 0.5 $m^2/g$.

The process is technically simpler, in a number of respects, than the conventional co-precipitation processes for obtaining cubic ferrites having the spinel structure. Thus, the lengthy filtration of the co-precipitates is dispensed with, and the predetermined Fe/Me ratio is preserved, since no component is lost through the filter. Moreover, the lengthy washing of the co-precipitates is no longer necessary. The presence of the alkali metal chloride during heating prevents the octahedra of the cubic ferrite from sintering, so that the powder obtained need not be milled before further processing, and the creation of crystal defects and a broad particle size spectrum is thereby avoided. In contrast to the products obtained in the ceramic process or in the co-precipitation process, the spinel powders obtained using the novel process are composed of regular octahedral crystallites with a very pronounced crystal habit. The size of the isotropic particles may be varied within a very wide range, depending on the reaction temperature used, and the particles obtained are of remarkably uniform size.

The above special particle properties ensure that the product has good dispersibility in organic media for the production of magnetically soft paints or plastoferrites, for shielding purposes. Furthermore, the powders obtained by the novel process exhibit good compression characteristics when compressed biaxially or isostatically. When these moldings are sintered, and hot-pressed biaxially or isostatically, the resulting magnetic ceramic is suitable for producing ferrite magnetic heads, and has a uniform particle size spectrum, and improved mechanical and magnetic properties compared with conventional ferrite ceramics.

Using the novel process, the finely divided the hexagonal $Me_2^1Y$ ferrite of the general formula II $M_2^1Me_2^1Fe_{12}O_{22}$, where $M^1$ is barium, strontium, calcium and/or lead and $Me^1$ is divalent manganese, copper, iron, cobalt, nickel, zinc, magnesium and/or equimolar amounts of lithium and trivalent iron, may likewise be prepared from a melt of sodium chloride and/or potassium chloride, if an $M^1$ chloride or carbonate, and $Me^1$ chloride or carbonate, iron(III) chloride and sodium carbonate and/or potassium carbonate are mixed, the mixture obtained is heated at from 800° to 1050° C., and the flaky hexagonal $Me_2^1Y$ ferrite formed is then isolated from the resulting melt of sodium chloride and/or potassium chloride by leaching with water.

When the novel process was carried out, it was found to be advantageous to employ the following molar ratios in the salt mixture to be heated: $Fe(III)/M^1 = 5-6$, $Fe(III)/Me^1 = 5-6$ and (Na+K)/chloride = 0.9-1.4. The components are thoroughly mixed in a conventional manner, usually by being milled in a ball mill, so that they are homogeneously distributed. This mixture is then heated at from 800° to 1050° C. for from 0.5 to 3 hours. After cooling, a mixture of $Me_2^1Y$ and alkali metal chloride is obtained, the salt constituents of this mixture being removed by dissolving them in water.

Using the novel process, $Me_2^1Y$ ferrites may be obtained directly as finely divided non-sintered powders which do not need to be milled for further processing. They consist of hexagonal flakes having a diameter of about 1–3 μm. The flakes obtained at about 900° C. have a diameter/thickness ratio of about 30, and are extremely thin. As the temperature increases, the flake thickness increases substantially, so that the above ratio is about 10 when the product is obtained at 1050° C. The values of the specific surface area (BET) are from 1 to 7 m²/g. The Zn₂Y ferrite powder of composition Ba₂Zn₂Fe₁₂O₂₂ obtained at 950° C. is a single phase as determined by X-ray defraction and has an $H_c$ value of less than 2 kA/m and a saturation magnetization of 34 nTm³/g. The measurements were carried out in a magnetic field of 160 kA/m.

The free-flowing non-sintered flaky ferrite powders obtained using the novel process posssess particularly good dispersibility, and are therefore particularly suitable for producing magnetic paints and plastoferrites. When the magnetic powders are subjected to biaxial or uniaxial dry or wet compression to produce magnetically soft ceramics for high frequency applications, the $Me_2^1Y$ particles, owing to their extremely flaky habit, are, as desired, oriented to a large extent so that the flakes are perpendicular to the direction of compression, this being the case in particular in the presence of a magnetic field.

The advantage of the novel process is that the industrial steps of dissolving and dispersing the starting salts, co-precipitation, filtration and drying may be completely dispensed with, so that this process is simpler and more economical to carry out than other, prior art processes.

Using the novel process, the hexagonal ferrites of the general formula (III) $M^2(Me^2Ti)_xFe_{12-2x}O_{19}$, where $M^2$ is barium or strontium, $Me^2$ is zinc, nickel and/or cobalt and x is from 0 to 2.0, may be equally advantageously prepared, the products having the required properties, if a barium or strontium salt, iron(III) chloride and sodium carbonate and/or potassium carbonate are mixed, with or without a salt of zinc, nickel and/or cobalt and a titanium compound, the mixture obtained is heated at from 700° to 1100° C. and the resulting finely divided flaky hexagonal ferrite of the above composition is then isolated by leaching with water.

To carry out the novel process, the individual components in powder form are mixed in a conventional manner, advantageously by being milled in a ball mill, to obtain a homogeneous distribution. In addition to the iron(III) chloride, the reaction mixture contains a barium or strontium salt, preferably the corresponding chloride or carbonate. When preparing the substituted ferrites of the above formula, ie. where x is greater than zero, it has proved to be advantageous if the zinc, nickel and/or cobalt salts used are the corresponding chlorides or carbonates. A suitable titanium compound is very finely divided titanium dioxide, also referred to as white pigment. The molar ratios in the reaction mixture are chosen so that the atomic weight ratio of iron to barium or strontium is 9–12. Furthermore, it has proved advantageous to employ a molar ratio of sodium and potassium to total chloride ions of 0.8–1.4.

The thoroughly mixed and milled mixture is then heated at from 700° to 1100° C. for from 0.5 to 3 hours. After cooling, a mixture of the ferrite and the alkali metal chloride is obtained, the salt constituents of this mixture being removed by dissolving them in water.

The novel process differs from the conventional processes in which in general $\alpha$-Fe₂O₃ is used as a starting material, in particular in that very finely divided, reactive iron oxide is only formed in situ during the reaction of the non-oxidic starting materials. At the same time, sodium chloride and/or potassium chloride are formed as finely divided by-products. The alkali metal chloride melts at a low temperature (at as low as about 650° C. for a eutectic mixture of NaCl and KCl), and forms a catalytic liquid phase which transports reactants rapidly. The salt constituents produced prevent the resulting ferrite crystallites from sintering.

Using the novel process, these ferrites may be obtained directly as finely divided non-sintered powders consisting of hexagonal flakes which, depending on the reaction and on the conditions of substitution, have a mean diameter of 0.1–0.7 μm. Transmission microscopy and scanning electron microscopy show that the powders obtained have a narrow particle size distribution. The BET specific surface areas ($S_{N2}$) are from 1 to 12 m²/g. For non-doped barium ferrite powders, $H_c$ = 360 kA/m and $M_r/\rho$ = 41 nTm³/g, while for pure strontium ferrite $H_c$ is as high as 425 kA/m. The powders prepared using the novel process thus possess superior magnetic properties compared with the products obtained by conventional ceramic processes.

Moreover, the free-flowing ferrite powders obtained possess particularly good dispersibility, and are therefore very useful for producing magnetic recording media. When used for producing magnetic tapes with the magnetic orientation along the running direction of the tape, the non-doped ferrite powders exhibit a very high orientation ratio (above 3). This is remarkable since the ferrite powders obtained by conventional ceramic processes, when used in magnetic tapes, exhibit orientation ratios of less than 2. The high orientation ratio produces the desired high remanence.

On conversion of the highly coercive ferrite powders to magnetic recording media, the coercive force is preserved, so that very highly coercive magnetic recording media can be produced. Because of this high $H_c$, it is difficult to change a magnetic recording, once it has been made. Furthermore, this makes the magnetic recordings substantially insensitive to stray fields, and stable. A particularly advantageous feature is the fact that the ferrites of the above formula can be doped, as described, to increase x and thereby decrease the coercive force, thus making it possible to match the coercive force of the tape to the bias setting of the read-write unit.

The examples which follow illustrate the invention. The magnetic measurements were carried out in a magnetic field of 160 or 800 kA/m.

EXAMPLE 1

8.7 g of BaCO₃, 5.7 g of ZnCl₂, 38.9 g of FeCl₃, 21.3 g of Na₂CO₃ and 27.8 g of K₂CO₃ are milled thoroughly for 20 minutes in closed centrifugal ball mill. The mixture is then heated at 950° C. for 1 hour, in a platinum crucible. The melt cake obtained after cooling is treated with water, and the product is filtered off, washed until salt-free and dried. The Ba₂Zn₂Fe₁₂O₂₂ ferrite powder obtained has the following properties: $H_c$ = 1.5 kA/m, $M_s/\rho$ = 33 nTm³/g, $M_r/\rho$ = 7 nTm³/g. The measurements were carried out in a magnetic field of 160 kA/m. The hexagonal crystal flakes of the powder have a diameter of from 1 to 3 μm.

EXAMPLE 2

The mixture from Example 1 is heated at 1000° C. for 1 hour, cooled, and then worked up as described in Example 1. The Zn₂Y ferrite powder obtained has the following properties: $H_c=1.1$ kA/m, $M_s/\rho=33$ nTm$^3$/g, $M_r/\rho=4$ nTm$^3$/g. The measurements were carried out in a magnetic field of 160 kA/m.

EXAMPLE 3

11.67 g of zinc hydroxide carbonate containing 56% by weight of zinc, 17.48 g of manganese(II) hydroxide carbonate containing 44% by weight of manganese, 84.3 g of FeCl$_3$, 41.3 g of Na$_2$CO$_3$ and 53.9 g of K$_2$CO$_3$ are milled thoroughly for 20 minutes in a closed centrifugal ball mill. The mixture is then heated at 1050° C. for 1 hour, in a platinum crucible. The melt cake obtained after cooling is treated with water, and the product is filtered off, washed salt-free and dried at 110° C. The manganese zinc ferrite powder obtained, which in an X-ray diagram shows only one phase, consists of octahedral crystallites having a particle diameter of 0.5 μm. The magnetic properties are as follows: $H_c=1.5$ kA/m, $M_r/\rho=5.8$ nTm$^3$/g, $M_s/\rho=62$ nTm$^3$/g. The magnetic measurements were carried out in a magnetic field of $H_m=160$ kA/m.

EXAMPLE 4

9.9 g of BaCO$_3$, 81.1 g of FeCl$_3$, 39.75 g of Na$_2$CO$_3$ and 51.8 g of K$_2$CO$_3$ are milled thoroughly for 20 minutes in a closed centrifugal ball mill. The mixture is then heated at 980° C. for 1 hour, in a platinum crucible. The melt cake obtained after cooling is treated with water, and the product is filtered off, washed salt-free and dried at 110° C. The barium ferrite powder obtained has the following properties: $H_c=357$ kA/m, $M_r/\rho=41$ nTm$^3$/g, $S_{N2}=5.0$ m$^2$/g. The measurements were carried out in a magnetic field of 800 kA/m.

EXAMPLE 5

7.4 g of SrCO$_3$, 81.1 g of FeCl$_3$, 39.75 g of Na$_2$CO$_3$ and 51.83 g of K$_2$CO$_3$ are milled thoroughly for 20 minutes in a closed centrifugal ball mill. The mixture is then heated at 960° C. for 1 hour, in a platinum crucible. The melt cake obtained after cooling is treated with water, and the product is filtered off, washed salt-free and dried at 110° C. The barium ferrite powder obtained has the following properties: $H_c=423$ kA/m, $M_r/\rho=41$ nTm$^3$/g, $S=3.7$ m$^2$/g. The measurements were carried out in a magnetic field of 800 kA/m.

EXAMPLE 6

11.8 g of BaCO$_3$, 4.63 g of basic zinc carbonate containing 56.5% by weight of Zn, 3.21 g of TiO$_2$ containing 59.6% by weight of Ti, 84.4 g of FeCl$_3$, 41.3 g of Na$_2$CO$_3$ and 53.9 g of K$_2$CO$_3$ are milled thoroughly for 20 minutes in a closed centrifugal ball mill. The mixture is then heated at 850° C. for 1 hour, in a platinum crucible. The melt cake obtained after cooling is treated with water, and the product is filtered off, washed salt-free and dried. The barium ferrite powder obtained, which is doped with zinc and titanium, has the following properties: $H_c=128$ kA/m, $H_R=172$ kA/m, $M_r/\rho=30$ nTm$^3$g, $S=9.5$ m$^2$/g. The measurements were carried out in a magnetic field of 800 kA/m.

EXAMPLE 7

A salt mixture is prepared as described in Example 6, but is heated from 1 hour at 950° C. instead of the temperature given in Example 6, and then washed and dried. The barium ferrite powder obtained, which is doped with zinc and titanium, has the following properties: $H_c=138$ kA/m, $H_R=187$ kA/m, $M_r/\rho=31$ nTm$^3$/g, $S=5.7$ m$^2$/g. The measurements were carried out in a magnetic field of 800 kA/m.

EXAMPLE 8

11.8 g of BaCO$_3$, 4.14 g of basic cobalt carbonate containing 49.8% by weight of Co, 2.81 g of TiO$_2$ containing 59.6% by weight of Ti, 86.0 g of FeCl$_3$, 42.1 g of Na$_2$CO$_3$ and 54.9 g of K$_2$CO$_3$ are milled thoroughly for 20 minutes in a closed centrifugal ball mill. The mixture is then heated at 900° C. for 1 hour, in a platinum crucible. The melt cake obtained after cooling is treated with water, and the product is filtered off, washed salt-free and dried. The barium ferrite powder obtained, which is doped with cobalt and titanium, has the following properties: $H_c=76.4$ kA/m, $H_R=103.7$ kA/m, $M_r/\rho=32$ nTm$^3$/g, $S=6.0$ m$^2$/g. The measurements were carried out in a magnetic field of 800 kA/m.

EXAMPLE 9

A salt mixture is prepared as decribed in Example 8, but is heated for 1 hour at 1000° C., instead of the temperature given in Example 8, and then washed and dried. The barium ferrite powder obtained, which is doped with cobalt and titanium, has the following properties: $H_c=90$ kA/m, $H_R=120$ kA/m, $M_r/\rho=32$ nTm$^3$g, $S=4.9$ m$^2$/g. The measurements were carried out in a magnetic field of 800 kA/m.

EXAMPLE 10

400 parts of a barium ferrite powder prepared as described in Example 4, with $H_c=357$ kA/m, 100 parts of a 20% strength solution of a copolymer of 80% of vinyl chloride, 10% of dimethyl maleate and 10% of diethyl maleate in a mixture of equal parts of tetrahydrofuran and dioxane, 103 parts of a 13% strength solution of a thermoplastic polyester-urethane obtained from adipic acid, butane-1,4-diol and 4,4'-diisocyanatodiphenylmethane, in a mixture of equal parts of tetrahydrofuran and dioxane, 24 parts of a commercial anionic wetting agent based on phosphoric acid esters and 231 parts of the above solvent mixture are mixed, and dispersed for 6 hours in a vibratory ball mill, using steel balls of 2 mm diameter. 199 parts of the above 13% strength solution of the thermoplastic polyester-urethane, 35 parts of the above solvent mixture, 0.3 part of stearic acid, 0.3 part of a commercial silicone oil and 0.6 part of hydroquinone are added, and dispersion is continued for 2 hours. The dispersion obtained is then filtered, and applied in a conventional manner to a 6 μm thick polyethylene terephthalate film, in an amount such that after orienting the flaky particles by passage under a magnetic field, and then drying and calendering the coating, a 5.7 μm thick magnetic layer is obtained. The magnetic tape has the following properties: $H_c=319$ kA/m, $H_R=335$ kA/m, $M_r=183$ mT, $M_s=213$ mT, orientation ratio $=3.2$. The properties were measured in a magnetic field of 800 kA/m.

EXAMPLE 11

The barium ferrite powder prepared in Example 9, which is doped with cobalt and titanium and has $H_c=90$ kA/m, is processed, as described in Example 10, to give a magnetic tape. The magnetic tape has the following properties: $H_c=107$ kA/m, $H_R=115$ kA/m, $M_r=145$ mT, $M_s=201$ mT, orientation ratio$=2.5$, layer thickness$=5.8$ μm. The measurements were carried out in a magnetic field of 800 kA/m.

We claim:

1. A process for the preparation of a finely divided ferrite of the formula $$MeFe_2O_4 \quad (I)$$

where $Me = aMn + bNi + cZn + dCo + eFe(II)$, and the atomic weight ratios a, b, c, d and e are each from 0 to 1 and their sum is 1, or $$M_2^1Me_2^1Fe_{12}O_{22} \quad (II)$$

where $M^1$ is barium, strontium, calcium and/or lead, and $Me^1$ is divalent manganese, copper, iron, cobalt, nickel, zinc, magnesium and/or equimolar amounts of lithium and trivalent iron, or $$M^2(Me^2Ti)_xFe_{12-2x}O_{19} \quad (III)$$

where $M^2$ is barium or strontium, $Me^2$ is zinc, nickel and/or cobalt and x is from 0 to 2.0, wherein the Me, $Me^1$, $Me^2$, $M^1$ and/or $M^2$ salts required for the particular composition corresponding to the formula (I), (II) or (III), iron(III) chloride and sodium carbonate and/or potassium carbonate aare mixed as powders, with or without a powdered titanium compound to form a mixture of powders, the mixture obtained is heated at from 700° to 1200° C. and the resulting finely divided ferrite of the predetermined composition is isolated from the heated mixture by leaching with water.

2. A process for the preparation of an isotropic ferrite powder having a spinel structure, of the formula $MeFe_2O_4$ (I), where $Me = a\ Mn + b\ Ni + c\ Zn + d\ Co + e\ Fe(II)$, and the atomic weight ratios a, b, c, d and e are each from 0 to 1 and their sum is 1, wherein one or more Me salts, iron(III) chloride and sodium carbonate and/or potassium carbonate are mixed as powders to form a mixture of powders, the mixture obtained is heated at from 800°–1200° C. and the resulting isotropic ferrite is isolated from the heated mixture by leaching with water.

3. A process for the preparation of a hexagonal $Me_2^1Y$ ferrite of the formula $M_2^1Me_2^1Fe_{12}O_{22}$ (II), where $M^1$ is barium, strontium, calcium and/or lead and $Me^1$ is divalent manganese, copper, iron, cobalt, nickel, zinc, magnesium and/or equimolar amounts of lithium and trivalent iron, wherein an $M^1$ chloride or carbonate, an $Me^1$ chloride or carbonate, iron(III) chloride and sodium carbonate and/or potassium carbonate are mixed as powders to form a mixture of powders, the mixture obtained is heated at from 800° to 1050° C. and the flaky hexagonal $Me_2^1Y$ ferrite formed is then isolated from the resulting melt of sodium chloride and/or potassium chloride by leaching with water.

4. A process for the preparation of a finely divided hexagonal ferrite of the formula $M^2(Me^2Ti)_xFe_{12-2x}O_{19}$ (III), where $M^2$ is barium or strontium, $Me^2$ is zinc, nickel and/or cobalt and x is from 0 to 2.0, wherein a barium or strontium salt, iron(III) chloride and sodium carbonate and/or potassium carbonate are mixed as powders, with or without a salt of zinc, nickel and/or cobalt as powders and a powdered titanium compound to form a mixture of powders, the mixture obtained is heated at from 700° to 1100° C. and the resulting finely divided flaky hexagonal ferrite of the above composition is then isolated from the heated mixture by leaching with water.

* * * * *